June 16, 1925.
J. MASON ET AL
AUTOMATIC THUMBER
Filed Oct. 27, 1924
1,542,628
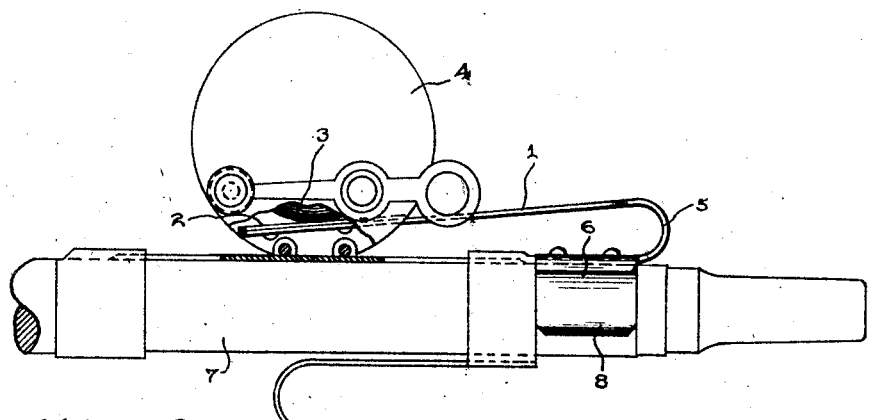
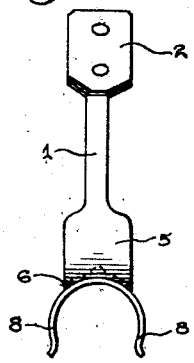
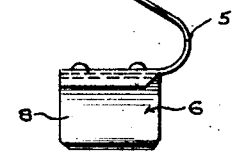
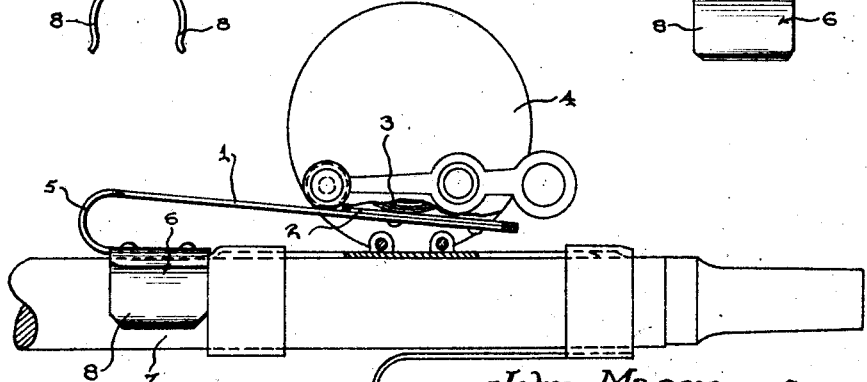
John Mason
Herman Mueller
Inventor
By
Attorney Patented June 16, 1925.

1,542,628

UNITED STATES PATENT OFFICE.

JOHN MASON AND HERMAN MUELLER, OF CHICAGO, ILLINOIS.

AUTOMATIC THUMBER.

Application filed October 27, 1924. Serial No. 746,166.

*To all whom it may concern:*

Be it known that JOHN MASON and HERMAN MUELLER, citizens of the United States of America, residing at Chicago, in the county of Cook and State of Illinois, have invented new and useful Improvements in Automatic Thumbers, of which the following is a specification.

The purpose of the invention is to provide a device for detachably mounting on a fishing rod in close proximity to the reel for bearing contact with the reel-contained portion of the line to brake the reel and, therefore, retard the latter to prevent overrunning of the line in casting.

A further purpose is to provide a device of this kind capable of slight longitudinal movement on the rod when attached, so as to vary the braking effect.

With these purposes in view, the invention consists in a construction and combination of parts of which a preferred embodiment is illustrated in the accompanying drawings, wherein:

Figure 1 is a view in side elevation of a portion of a fishing rod and the attached reel with the invention shown in operative position thereon.

Figures 2 and 3 are respectively side and end elevational views of the invention detached.

Figure 4 is a side elevational view showing the invention applied to a fishing rod so as to be longitudinally movable therealong by means of the hand grasping the rod.

The invention comprises a resilient shank 1 carrying at one extremity a shoe 2 riveted or otherwise secured to the shank and adapted for bearing contact with the coiled portion 3 of the fishing line carried on the reel 4. The shank 1 is provided with a return bend 5 at the end remote from the shoe and on the bent back portion is secured to the clip 6, the latter conforming cross sectionally to the contour of the rod 7 with the legs 8 of sufficient resilience to permit them to be sprung over the rod.

The pressure of the shoe on the reel-contained portion of the line may be increased or diminished by the proper spreading or lessening of the return bend 5, and if the device is used in the position shown in Figure 4, the return bend may act as a loop for the fore finger to draw the device toward the rear end of the handle or may act as a rest for the ball of the thumb in pushing the device forward.

In its normal position, the shank assuming an inclination with respect to the handle of the rod, drawing it rearwardly or pushing it forward as above described, diminishes or increases the pressure of the shoe upon the line. Thus, the pressure and the resultant braking effect may be readily diminished simply by the longitudinal movement of the device, as above indicated.

The invention having been described, what is claimed as new and useful is:

In a reel brake, the combination with a fishing rod and a reel mounted thereon, of a resilient shank provided at one extremity with a brake element for bearing contact with the coiled portion of a fishing line carried upon the reel and at the remote extremity with a return bend provided at the end of the bent back portion with a resilient clip for frictional sliding engagement with the fishing rod.

In testimony whereof they affix their signatures.

JOHN MASON.
HERMAN MUELLER.